Nov. 19, 1940. B. A. BARR 2,221,901
TRANSMISSION SYNCHRONIZER
Filed Oct. 25, 1939
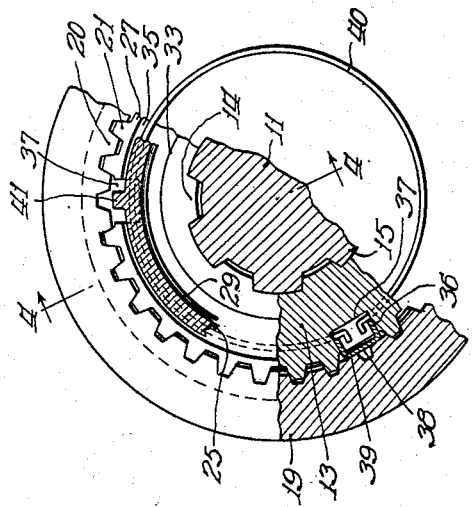
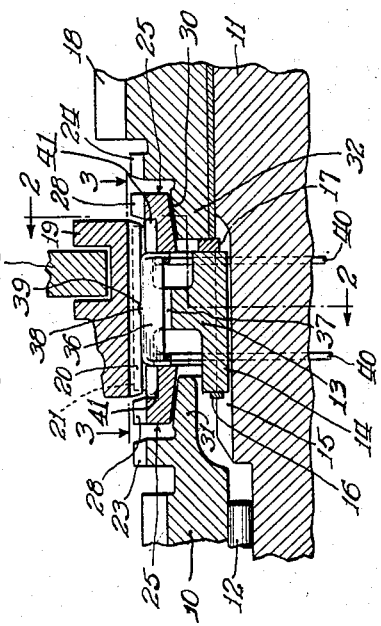
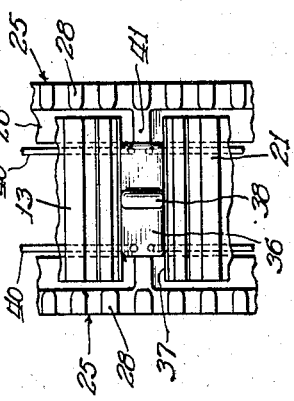
Inventor:
Bruce A. Barr
By: Edward C. Gritzbaugh
Atty.

Patented Nov. 19, 1940

2,221,901

UNITED STATES PATENT OFFICE 2,221,901

TRANSMISSION SYNCHRONIZER

Bruce A. Barr, Muncie, Ind., assignor to Borg-Warner Corporation, Chicago, Ill., a corporation of Illinois Application October 25, 1939, Serial No. 301,129

9 Claims. (Cl. 192—53)

This invention relates to synchronizing change speed gear transmissions of the type employed, for example, in motor vehicles wherein there is provided means for effecting synchronization of a pair or pairs of torque transmitting members preparatory to connecting said members in positive drive engagement with each other through the medium of a movable positive drive or jaw clutch element, drivingly associated with one of said members and adapted to be shifted axially into clutching engagement with a complementary jaw clutch element drivingly associated with the other of said members. The invention is particularly directed to synchronizing transmissions of the type wherein the synchronizing means comprises friction clutch elements drivingly associated with the respective torque transmitting members, one of said elements being adapted to be moved axially into engagement with the other in the initial stage of shifting of the movable jaw clutch element through the medium of a thrust bar or a plurality of thrust bars having axial thrust transmitting engagement with the movable jaw clutch element and the movable friction clutch element respectively.

The invention has as one of its objects, to simplify and reduce the expense of manufacture of a synchronizing transmission of the type outlined above. It has this object particularly in connection with the provision of resilient means for urging the thrust bars radially outwardly to establish the thrust receiving engagement with the interior of the movable jaw clutch sleeve, such resilient means being in the form of expander rings adapted to simultaneously engage all of the thrust bars.

In previous synchronizers of this general type, the synchronizer rings have been provided with axially opening notches receiving the ends of the thrust bars and thereby forming oscillatory lost motion connections between the rings and the torque transmitting member with which they are associated, such lost motion connections providing for biasing of the synchronizer rings in blocking relation to the shiftable jaw clutch sleeve, whereby to restrain the axial advance of the sleeve into positive clutching engagement with its cooperating clutch element until synchronization has been attained.

The present invention contemplates an arrangement wherein the weakening effect of such axially opening notches in the synchronizer rings is eliminated, and the rings are of uniform cross-sectional area throughout their circumferential extent, and aims to provide a substitute for the formerly employed lost motion connection which does not increase the expense of manufacture of the synchronizer.

Other objects, the advantages and uses of the invention will become more apparent after reading the following specification and claims, and after consideration of the drawing forming a part of the specification, wherein:

Fig. 1 is an axial sectional view of a transmission synchronizer embodying the invention;

Fig. 2 is a transverse sectional view thereof taken as indicated by the line 2—2 of Fig. 1;

Fig. 3 is a plan view of the same with portions removed to disclose the interior, taken as indicated by the line 3—3 of Fig. 1; and Fig. 4 is an axial sectional view taken as indicated by the line 4—4 of Fig. 2.

As an example of one form in which the invention may be embodied, I have shown in the drawing a transmission synchronizer including a pair of aligned torque transmitting members 10 and 11, the forward end of the member 11 being piloted, as at 12, in the rear end of the member 10. The member 10 may be the driving shaft of a conventional automobile transmission, and the member 11 the driven shaft of such a transmission. A hub 13 is provided with internal splines 14 by means of which it is secured to the splined region 15 of the shaft 11 and is retained in an axially fixed position by means of retaining rings 16 and 17 recessed into the splined region 15.

A positive drive connection is adapted to be established between the torque transmitting members 10 and 11 or between a reduction geared torque transmitting member 18 and the member 11, by means of an axially movable positive drive or jaw clutch sleeve 19 formed with internal splines or clutch teeth 20 in sliding splined engagement with splines 21 on the periphery of the hub member 13, and adapted to be shifted axially by a shifting fork 22 to bring the splines 20 into positive clutching engagement with clutch teeth 23 formed on the torque transmitting member 10, or clutch teeth 24 formed on the torque transmitting member 18.

Upon being moved into clutching engagement with the teeth 23, the sleeve 19 will receive rotation from the drive shaft 10 and transmit it directly through the hub 14 to the driven shaft 11. Upon being moved in the opposite direction into clutching engagement with the teeth 24, the sleeve 19 will receive rotation from the torque transmitting member 18 through a counter shaft gear cluster (which is of conventional form and arrangement and therefore not illustrated) and will transmit such rotation through the hub member 14 to the driven shaft 11.

In order to synchronize a torque transmitting member 10 or 18 with the sleeve 19, preparatory to establishing such positive clutching engagement, I provide a pair of synchronizer rings 25, each including a substantially cylindrical collar portion 26 (see Fig. 4) rotatably mounted within the rim portion 27 of the hub 13, and a peripheral portion which is provided with blocker teeth 28 between which the splines 20 of the sleeve 19 must pass before the clutching engagement with teeth 23 or 24 may be established. The opposed ends of the teeth 28 and of splines 20 may be chamfered, in accordance with well known practice. The synchronizer rings 25 are provided with internal conical friction clutch faces 29 adapted to engage complementary external conical friction clutch faces 30 of friction clutch elements 31 and 32, formed on the torque transmitting members 10 and 18 respectively.

The hub 13 is I-shaped in cross section, including a hub proper 33, an annular radially extending web portion 34, and the rim portion 27, defining between them a pair of axially opening annular recesses 35 in which the collar portions 26 of the synchronizer rings are received.

The mounting of the synchronizer rings 25 within the rim of the hub 13 is such as to allow them to move both circumferentially and axially with respect to the hub. The axial movement enables them to establish engagement with their respective cooperating friction clutch elements 31 and 32. Such axial movement is transmitted to a synchronizer ring from the movable jaw clutch sleeve 19 during the initial stage of shifting movement thereof, through the medium of a plurality of thrust bars 36 which are interposed between the sleeve 19 and the hub 13, and are accommodated in axially extending slots 37 extending entirely through the rim 27 and into the web 34. The thrust bars 36 are confined in the slots 37 against circumferential movement, but are free to slide longitudinally therein in paths parallel to the axis of rotation of the torque transmitting members 10 and 11.

The thrust bars 36 may be of hollow stamped sheet metal construction, of the type illustrated in the joint application of myself and S. O. White, Serial No. 250,908 filed January 14, 1939, for synchronizing transmission. They are formed, intermediate their ends, with projections 38, engageable in recesses 39 in the interior of the sleeve 19, and yieldingly urged into such engagement by expander rings 40 simultaneously engaging all of the bars. Thus a yieldable thrust receiving connection is established between the bars and the sleeve 19, so that when the sleeve is shifted axially, it will tend to carry the bars therewith. The axial thrust thus developed in the bars will be transmitted to a synchronizer ring 25 through the abutting engagement of the ends of the bars with the end face of the collar 26.

In previous synchronizers of this general type, the synchronizer rings 25 have been provided, in the collar portion 26 thereof, with axially opening notches receiving the ends of the bars 36 so as to form oscillatory lost motion connections between the rings and the hub. In the present invention, the rings 25 are of full cross-sectional width throughout their circumferential extent, and the bars 36 are considerably shortened, so as to engage against the axial extremities of the shoulders 26. An oscillatory lost motion connection between each ring 25 and the hub 13 is established through the medium of lugs 41 formed integrally with the ring and projecting radially outwardly from the collar portion 26 thereof, into the axial extremities of the slots 37.

It may now be noted that the slots 37 serve the dual purpose of forming slideways for the thrust bars 36, and cooperating with the lugs 41 to form lost motion connections between the synchronizer rings and the hub, the thrust bars occupying the central regions of the slots and the lugs occupying the end regions of the slots. The thrust bars are of sufficient width to substantially fill the slots while the lugs 41 are of considerably less width than the slots so as to provide for the lost motion of the rings relative to the hub.

In the operation of a synchronizer embodying the invention, assuming the movable jaw clutch sleeve 19 to be in a neutral position as shown in Figure 1, and that the operator desires to shift the transmission into "intermediate," the shifting fork 22 is urged toward the right, viewing Figure 1, thereby urging the sleeve 19 toward the right, and with it the three thrust bars 36, through the medium of the yieldable break away thrust transmitting connection 38, 39. The ends of the bars, engaging a synchronizer ring 25, will urge the latter into frictional clutching engagement with the friction clutch element 32 of the torque transmitting member 18, thus causing the latter to approach the speed of rotation of the sleeve 19. This frictional engagement of the synchronizer ring 25 will also be effective to cause the ring 25 to become biased in position blocking further travel of the sleeve 19 until, upon the completion of synchronization, the synchronizer ring will move back to a neutral position, allowing the splines 20 of the sleeve 19 to pass between the blocker teeth 28 and into positive clutching engagement with the teeth 24 of the torque transmitting element 18.

The invention has the advantage of providing a synchronizer which is relatively simple and inexpensive in construction, has a minimum number of parts, is easy to assemble, is sure in operation, and is very durable.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:

1. In a transmission synchronizer, a torque transmitting member, a synchronizer ring shiftable axially for establishing a frictional driving connection between said member and a part to be synchronized therewith, an annular positive drive element drivingly connected to said member, and shiftable axially for establishing a positive driving connection between said member and said part, said member having an axially extending slot, and a thrust bar slidable in said slot, arranged to receive thrust from said positive drive element and to transmit such thrust to said ring, the latter having a lug projecting into said slot to form an oscillatory lost motion driving connection between the ring and said member, and having blocking means adapted, in one position of said lost motion connection, to block the path of axial advance of said positive drive element until synchronization has been attained.

2. In a transmission synchronizer, a torque transmitting member, a synchronizer ring adapted under axial pressure to establish a synchronizing frictional driving connection between said member and a part to be synchronized therewith, an annular positive drive element drivingly connected to said member and shiftable axially for establishing a positive driving connection between said member and said part, said member having in its peripheral region an axially extending slot, and a thrust bar slidable in said slot, arranged to receive thrust from said positive drive element and to transmit such thrust to said ring, the latter having a lug projecting into said slot to form an oscillatory lost motion driving connection between the ring and said member, and having blocking means adapted, in one position of said lost motion connection, to block the path of axial advance of said positive drive element until synchronization has been attained.

3. In a transmission synchronizer, a torque transmitting member, a synchronizer ring adapted under axial pressure to establish a synchronizing frictional driving connection between said member and a part to be synchronized therewith, an annular positive drive element drivingly associated with said member, and shiftable axially for establishing a positive driving connection between said member and said part, said member having an axially extending slot, and a thrust bar slidable in said slot, having a projection receivable in a corresponding recess in the interior of said positive drive element so as to form a yieldable breakaway thrust receiving connection therewith, and arranged to transmit to said ring the thrust thereby received, said ring having a lug projecting into said slot to form an oscillatory lost motion driving connection between the ring and said member, and having blocking means adapted, in one position of said lost motion connection, to block the path of axial advance of positive drive element until synchronization has been attained.

4. In a transmission synchronizer, a torque transmitting member, a synchronizer ring of uniform axial width throughout its circumferential extent adapted under axial pressure to establish a synchronizing frictional driving connection between said member and a part to be synchronized therewith, an annular positive drive element drivingly connected to said member and shiftable axially for establishing a positive driving connection between said member and said part, said member having in its periphery an axially extending slot, a thrust bar received in said slot, arranged to receive thrust from said positive drive element and having an end in abutting engagement with the inner radial face of said ring so as to transmit such thrust thereto, and a pair of expander rings engaging axially spaced regions of said thrust bar and urging the same radially outwardly so as to establish said thrust receiving engagement, said ring having a lug projecting into said slot to form an oscillatory lost motion driving connection between the ring and said member, and having blocking means adapted, in one position of said lost motion connection, to block the path of axial advance of said positive drive element until synchronization has been attained.

5. In a transmission synchronizer, a torque transmitting member including a radial web portion and a rim portion forming together with said web portion a pair of opposed axially opening annular recesses, a pair of opposed synchronizer rings of uniform axial dimension throughout their circumferential extent, loosely mounted in said recesses and adapted under axial pressure to establish synchronizing frictional driving connection between said member and a part to be synchronized therewith, an annular positive drive element encircling said member, drivingly connected thereto and shiftable axially for establishing a positive driving connection between said member and said part, said member having in its periphery a plurality of axially extending, circumferentially spaced slots, a plurality of relatively short thrust bars received in the respective slots, their ends in abutting thrust transmitting association with the inner radial faces of the respective rings, and their radially outer regions in thrust receiving association with said positive drive element, and a pair of expander rings engaging axially spaced regions of said thrust bars and urging them radially outwardly so as to establish said thrust receiving engagement.

6. In a transmission synchronizer, a torque transmitting member including a radial web portion and a rim portion forming together with said web portion a pair of opposed axially opening annular recesses, a pair of opposed synchronizer rings of uniform axial dimension throughout their circumferential extent, loosely mounted in said recesses and adapted under axial pressure to establish synchronizing frictional driving connection between said member and a part to be synchronized therewith, an annular positive drive element encircling said member, drivingly connected thereto and shiftable axially for establishing a positive driving connection between said member and said part, said member having in its periphery a plurality of axially extending, circumferentially spaced slots, a plurality of relatively short thrust bars received in the respective slots, their ends in abutting thrust transmitting association with the inner radial faces of the respective rings, and their radially outer regions in thrust receiving association with said positive drive element, and an expander ring engaging all of said thrust bars and urging them radially outwardly to establish clutch thrust receiving engagement.

7. A transmission synchronizer as defined in claim 6, including means forming an oscillatory lost motion driving connection between each of said synchronizer rings and said torque transmitting member, each ring including blocking means adapted, when the ring is in one position of such lost motion connection, to block axial advance of said positive drive element into positive driving position.

8. In a transmission synchronizer, a torque transmitting member including a rim defining an axially opening annular recess, a synchronizer ring having a collar portion loosely mounted in said recess, and a blocker portion projecting radially outwardly from one side of said collar portion, said ring being adapted under axial pressure to establish a synchronizing frictional driving connection between said member and a part to be synchronized therewith, a movable jaw clutch sleeve encircling said member, drivingly connected thereto and shiftable axially for establishing a positive driving connection between said member and said part, said member having an axially disposed slot extending through said rim, and a thrust bar slidable in said slot, arranged to receive thrust from said sleeve and to transmit such thrust to said ring, the latter having a lug projecting radially outwardly from said collar into said slot to form an oscillatory lost motion connection between the ring and said member, said blocking portion being adapted in one position of said lost motion connection to block the path of axial advance of said movable jaw clutch sleeve until synchronization has been attained.

9. A transmission synchronizer as defined in claim 8, wherein said sleeve is formed with internal teeth in splined engagement with the periphery of said member and adapted to engage jaw clutch teeth on said part for establishing said positive driving connection, and wherein said blocking portion is in the form of teeth adapted to register with said internal teeth when in blocking position.

BRUCE A. BARR.